United States Patent [19]

Hessels

[11] 4,093,006
[45] June 6, 1978

[54] DEVICES FOR GRIPPING WHEELS

[76] Inventor: Eleutheer A. Hessels, Europark Noord 39, 2700 Sint Niklaas, Belgium

[21] Appl. No.: 784,510

[22] Filed: Apr. 4, 1977

[30] Foreign Application Priority Data

Apr. 7, 1976 Belgium ............................. 840441
Mar. 21, 1977 Belgium ............................. 255755

[51] Int. Cl.² .......................................... B25H 5/00
[52] U.S. Cl. ............................................. 144/288 A
[58] Field of Search ................... 144/288 A; 157/1.24

[56] References Cited

U.S. PATENT DOCUMENTS

| | | | |
|---|---|---|---|
| 2,569,788 | 10/1951 | Weaver | 157/1.24 |
| 3,710,838 | 1/1973 | Duquesne | 157/1.24 |
| 3,818,968 | 6/1974 | Hogg | 157/1.24 |
| 3,823,757 | 7/1974 | Hogg | 157/1.24 |
| 3,891,019 | 6/1975 | Holladay | 144/288 A X |
| 4,034,786 | 7/1977 | Feldmann, et al. | 144/288 A |

Primary Examiner—Al Lawrence Smith
Assistant Examiner—James G. Smith
Attorney, Agent, or Firm—Bacon & Thomas

[57] ABSTRACT

The invention pertains to improvements to devices for fitting and removing tires, whereby a clamping device is provided for the rims, characterized by the fact that the latter mainly consists of the combination of three guides attached to a common support so as to form equal angles with respect to each other, whereby said support is fitted so as to be free to rotate around a vertical shaft, on each guide a sliding element which is provided with at least one clamping element which can cooperate with the wheel rim; in connection with each sliding element a link which connects to a second common support which is fixed upon aforesaid shaft; braking means which are provided between aforesaid first common support and an element which is fixed with respect to the frame of the machine, means which permit the adjustment of the pressure between afore-mentioned braking means and the adjacent parts, and means for driving afore-mentioned shaft.

4 Claims, 4 Drawing Figures

DEVICES FOR GRIPPING WHEELS

The present invention pertains to improvements to devices for the fitting and the removing of tires, with which a very wide range of different thicknesses and widths of tires and rims can be handled, whereby the device which operates most simply, efficiently and trustworthily, offers a maximum safety for the tire as well as for the rim, which is of capital importance in the case of light metal rims, as these are most easily damaged.

The improvements which constitute the subject of the present application mainly consist in providing, in such a device for the fitting and the removing of tires, a clamping device, more particularly, a device which permits an appropriate attachment and a precision centering of the wheel rim.

The clamping device according to the invention which has the above-mentioned advantages and others as well, consists for this purpose in the combination of three guides fitted on a first common support and forming equal angles with respect to each other, whereby said support is fitted so as to be free to rotate around a vertical shaft; on each guide a sliding element which is provided with at least one clamping element which can act upon the wheel rim; connected to each sliding element, a link which connects to a second common support which is fixed upon afore-mentioned shaft; braking means applied between aforesaid first common support and an element which is firmly attached to the frame of the machine; means which permit the adjustment of the pressure between afore-mentioned braking means and the adjacent parts, and means for driving afore-mentioned shaft.

For the purpose of better showing the characteristics of the invention, a preferred form of embodiment will be described hereinafter, as an example and without any attempt at limitation, with reference to the appended drawings in which.

Figure 1:
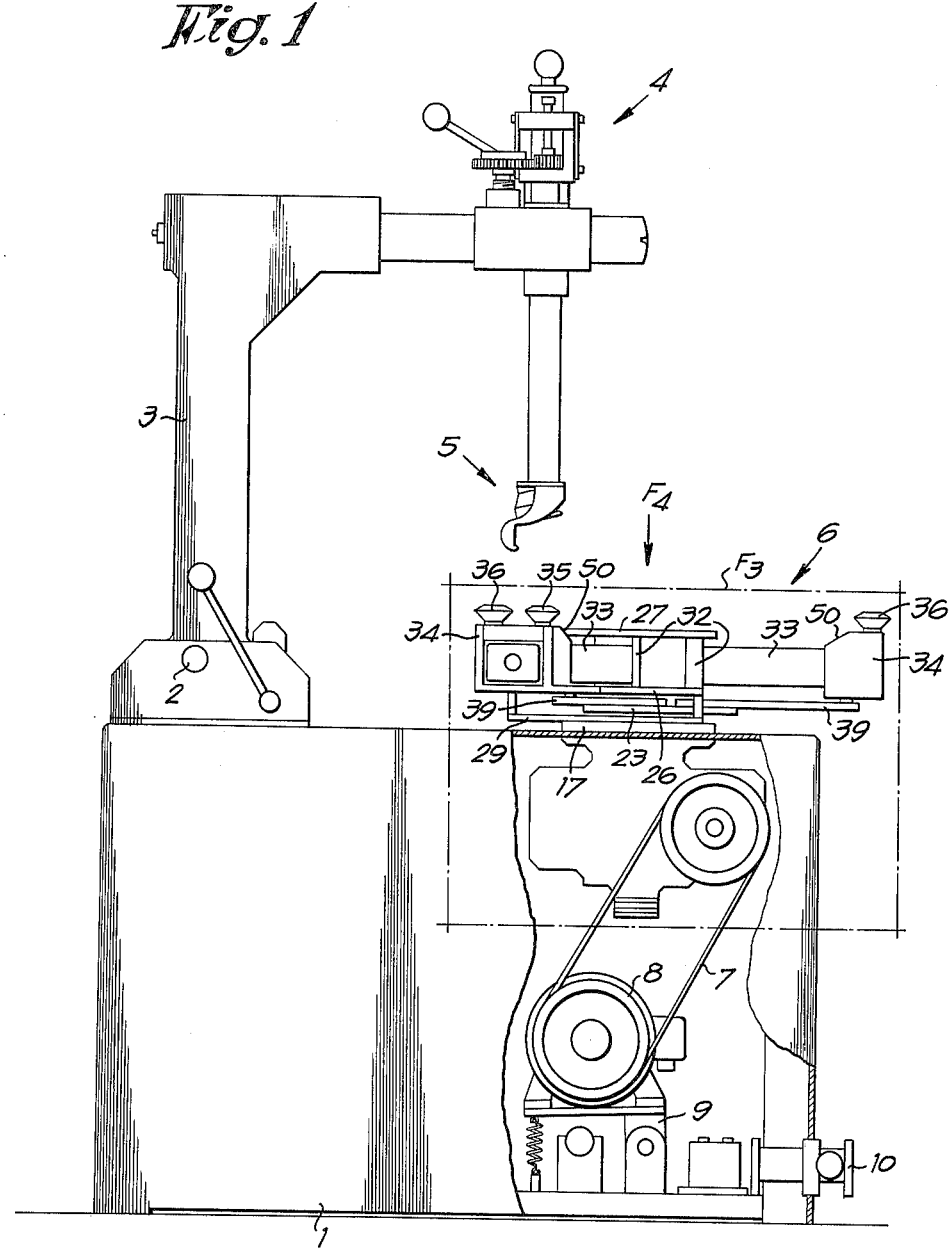
FIG. 1 shows a schematic side view of a device for fitting, and respectively removing, tires, upon which a clamping device according to the invention has been applied.
Figure 2:
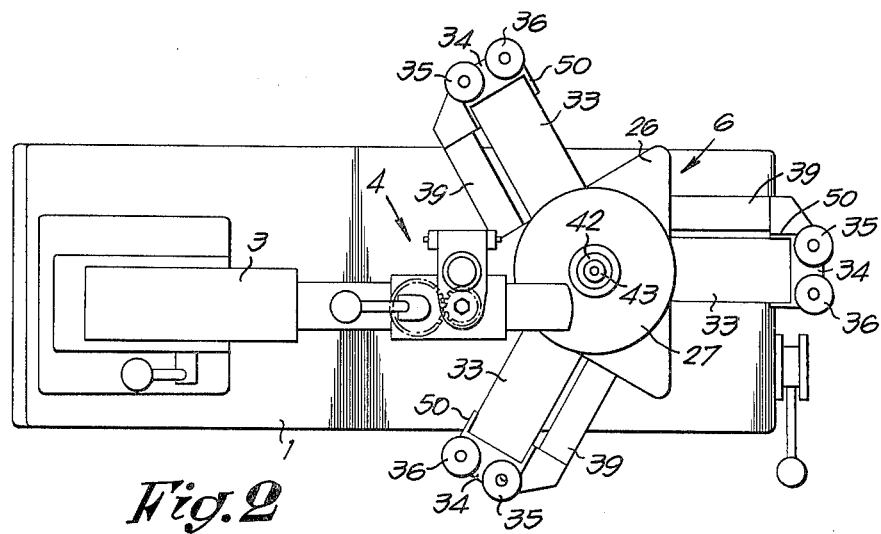
FIG. 2 shows a schematic top view of FIG. 1.
Figure 4:
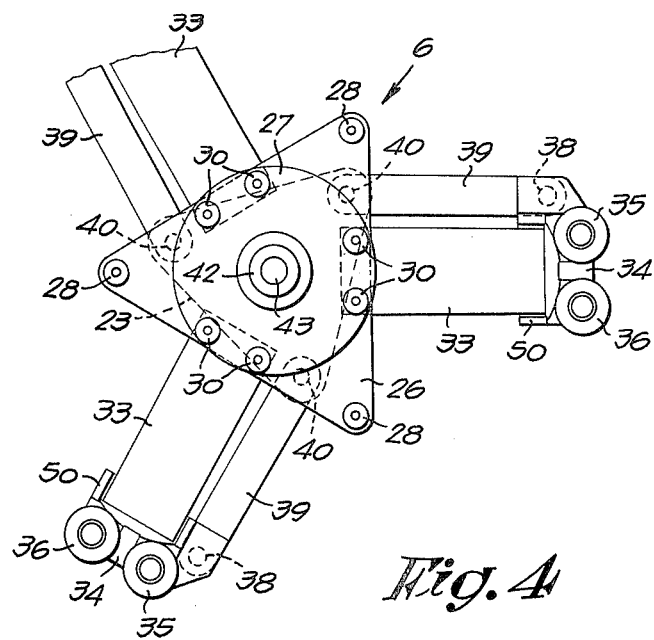
FIG. 4 is a view according to arrow F4 in FIG. 1.

As illustrated in FIGS. 1 and 2, a machine which is shown as a nonlimiting example is fitted with a clamping device according to the invention, mainly consists of a lower part or chassis 1, upon which is provided a column 3 which can pivot towards the rear around a shaft 2, and whereby a clamping device 4 for the fitting and removing tool 5 is attached to this column. Upon aforesaid frame 1 there is further provided a clamping device 6 according to the invention.

The clamping device 4 and the tool 5 being the subject of other patent applications by the Applicant, these will not further be described in the present application.

The clamping device according to the invention is driven via an approrpiate V belt or suchlike 7 by an electric motor 8 which is appropriately attached to frame 1 by means of a bracket 9 and which can for instance be controlled by means of a foot switch 10.

The belt or suchlike 7 in this case drives a worm 11 which in its turn cooperates with a worm wheel 12 which bears in some appropriate manner, such as for instance by means of ball bearings 13-14 in a worm wheel casing 15, which is fixed in some appropriate manner, such as for instance by means of bolts 16 and a ball bearing plate 17 to the frame 1.

The hub 18 of aforesaid worm wheel 12, is fitted by means of a key or suchlike 19 upon a shaft 20 which extends towards the top and upon which are fitted successively a ball bearing included in afore-mentioned ball bearing plate 17, a brake lining 21, a spacing ring 22, a triangular plate 23 and two ball bearings, respectively 24 and 25, whereby the former serves as carrier for a second triangular plate 26 whereas the latter serves as carrier for a cylindrical plate 27.

Triangular plate 26 is connected at each angle, by means of a screw 28, to a second triangular plate 29 which is fitted above brake lining 21 and below spacing ring 22 and is fitted so as to be free to rotate around shaft 20. Afore-mentioned triangular plate 26 is further connected on each of its bases by means of two pairs of appropriate screws 30 and 31 and by means of a block 32 to afore-mentioned disc 27, a guide 33 being connected to each of the thus attached blocks 32 for a sliding element 34 which is provided on its top side in the present case with two knobs, respectively 35 and 36, which in the present case, although not necessarily, have a cylindrical part 37 at the bottom.

The lower end of each sliding element 34 is hingedly connected by means of a pivot 38 to a link 39, which itself is hingedly connected, by means of a pivot 40 to an apex of triangular plate 23, the latter being firmly attached by means of a key 41 to afore-mentioned shaft 20.

Towards the top, the assembly is completed by a pressure plate 42 which is connected by means of a screw 43 to shaft 20, whereas at the bottom, aforesaid shaft 20 is provided with a part 44 of smaller diameter which terminates by a threaded part 45 with which can cooperate a nut 46 and a lock nut 47. Between nut 46 and a small pressure plate 48 which fits against hub 18 of worm wheel 12, there is finally provided a spring 49, which in the present case is made up of dished spring washers, and by means of which, by an appropriate tightening of respective nuts 46 and 47, the pressure can be determined of parts 17, 29 upon the brake lining 21, which may or may not be attached to one of these parts 17-29.

Each sliding element 34 is finally provided with a bevelled surface 50, and each of the knobs 35-36 is of conical shape.

The use and operation of the above-described clamping device is extremely simple and as follows.

In position of rest, the sliding elements 34 are in their outermost position as shown in the figures.

The rim or wheel is then placed, with the central part of the rim, free on disc 27 after which motor 8 is switched on which, via belt 7 and worm 11 with worm wheel 12, drives shaft 20, which in its turn drives triangular plate 23.

Due to the pressure exerted by springs 49, sufficient braking force is obtained from the lining 21 between the disc 17 and the plate 29 for the latter as well as the parts attached to it to remain stationary.

Figure 3:
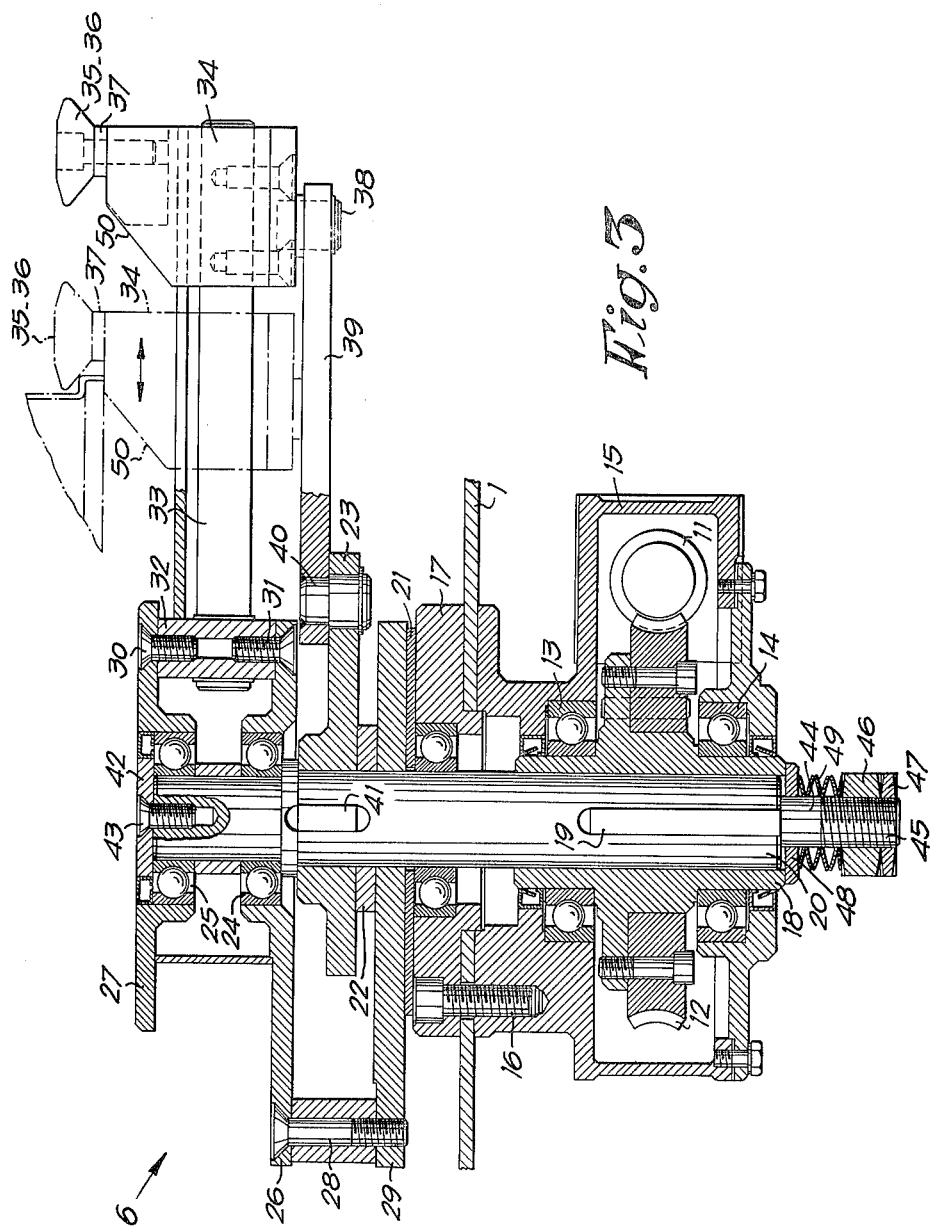
FIG. 3 shows, to a larger scale, that part in FIG. 1 which is indicated by F3.

We thus obtain, that by the rotation of plate 23, the sliding elements 34 are simultaneously pulled towards the center of the device until they make contact with the rim. Due to the bevelled surfaces of the sliding elements, the rim is automatically pushed upward in order finally, as schematically shown in FIG. 3, to be pressed against knobs 35-36.

We consequently obtain that the rim or wheel has been automatically centered and is firmly gripped by the knobs.

As soon as the force, previously adjusted by means of nut 46 and sping 49, has been reached, or in other words as soon as the rim has been gripped by knobs 35-36 so as no longer to be able to rotate, the frictional resistance of lining 21 is overcome, so that plates 26-29 and 27 will follow the movement of rotation.

We thus obtain that the rim is automatically centered and gripped, whereby, as soon as the clamping of the rim is sufficient, the latter will automatically be rotated in order to fit or to remove a tire.

Although per sliding element 34 one knob might be sufficient, it is preferable to provide two knobs per sliding element, so as to avoid indenting the rim.

It is quite obvious that the present invention is by no means limited to the form of embodiment described above and illustrated in the appended drawings, but that such a clamping device may be produced in all sorts of shapes and dimensions without going beyond the scope of the invention.

What I claim is:

1. An apparatus for gripping a wheel to permit removal of a tire fitted onto the wheel, comprising: a vertical drive shaft (20), means (7, 8) for rotating said drive shaft, a first horizontal support (26, 27, 29) rotatably mounted around said drive shaft, at least three radial guide arms (33) circumferentially spaced at equal angles around said drive shaft (20) and each having one end fixedly secured to said first horizontal support, at least three slidable members (34) each slidably mounted on a respective one of said guide arms and each having at least one claw member (50) adapted to grip on the rim of a wheel, a second horizontal support fixed on said drive shaft, at least three link members (39) each pivoted at one end (40) on said second horizontal support (23) and each pivoted at the other end (38) on a respective one of said slidable members (33), braking means arranged between said first horizontal support and a fixedly mounted frame member, and means for adjusting the pressure between said braking means, said first horizontal support and said frame member.

2. An apparatus according to claim 1, wherein said second horizontal support (23) is of triangular shape, said one ends of said link members (39) being pivoted at the apexes of said triangular horizontal plate.

3. An apparatus according to claim 1, wherein said first horizontal support comprises a first triangular plate (26) to each of the sides of which one end of a respective one of said three guide arms (33) is fixedly secured, a second triangular plate (29), said first triangular plate being mounted above said second triangular plate (29) arranged below said second horizontal support, and a further plate (27) connected to said first triangular plate (26) and being adapted to support a wheel rim.

4. An apparatus according to claim 1, wherein said braking pressure adjusting means comprises a spring mounted between a part fixed on said shaft and a tightening nut on said shaft.

* * * * *